Nov. 30, 1965  J. DELLOUE  3,221,305
SUPERVISORY REMOTE CONTROL AND TELEMETERING SYSTEM
Filed Jan. 16, 1961  8 Sheets-Sheet 2
Fig.2 - TIMING SCHEDULE OF THE RECTANGULAR WAVES PRODUCED BY THE FLIP-FLOPS
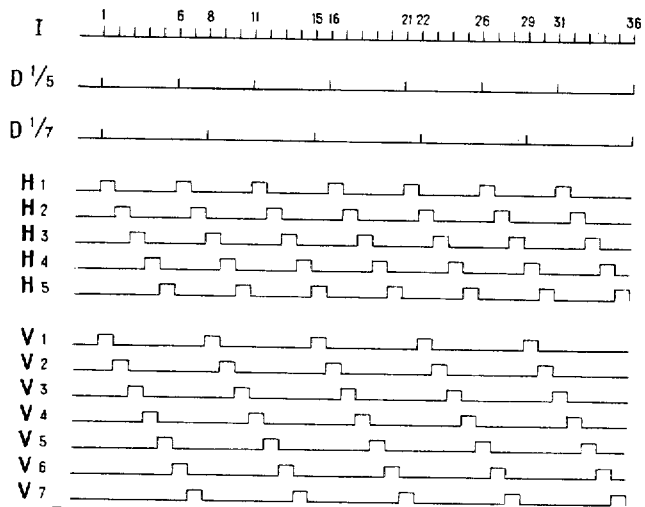
|  | H₁ | H₂ | H₃ | H₄ | H₅ |
|---|---|---|---|---|---|
| V₁ | 1 | 22 | 8 | 29 | 15 |
| V₂ | 16 | 2 | 23 | 9 | 30 |
| V₃ | 31 | 17 | 3 | 24 | 10 |
| V₄ | 11 | 32 | 18 | 4 | 25 |
| V₅ | 26 | 12 | 33 | 19 | 5 |
| V₆ | 6 | 27 | 13 | 34 | 20 |
| V₇ | 21 | 7 | 28 | 14 | 35 |
DIAGRAM OF THE COMPARTMENTS OF THE IDENTIFIER MATRIX
Fig: 2A
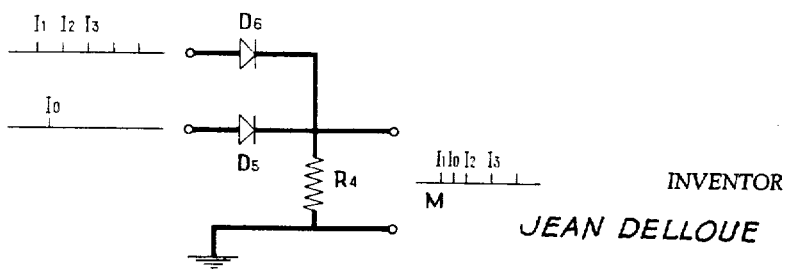
Fig: 10
INVENTOR
JEAN DELLOUE
BY Toulmin & Toulmin
ATTORNEYS

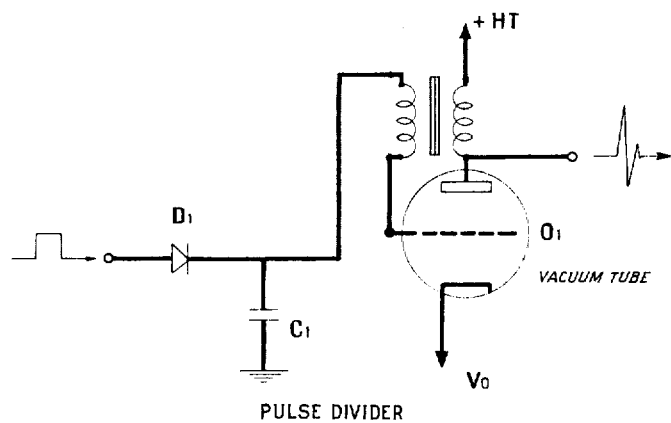
PULSE DIVIDER
Fig: 3
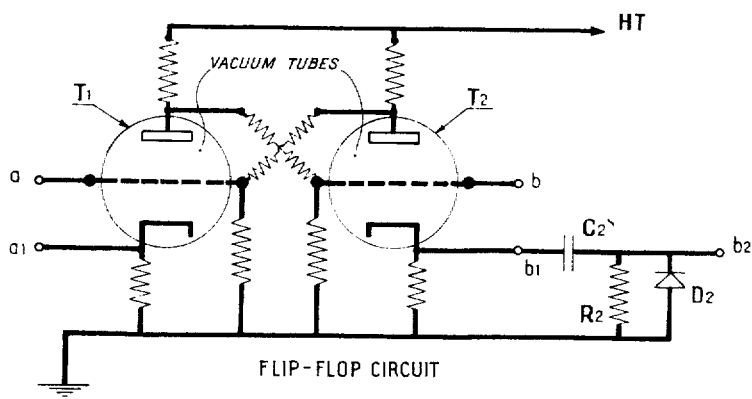
FLIP-FLOP CIRCUIT
Fig: 4
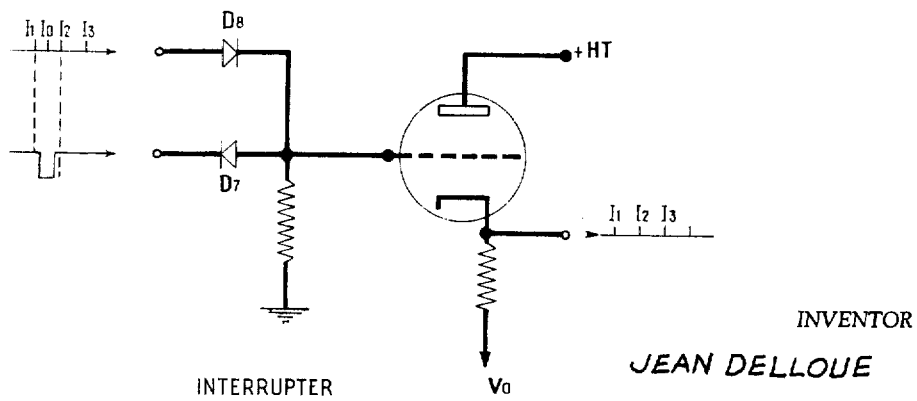
INTERRUPTER
Fig: 11
INVENTOR
JEAN DELLOUE Nov. 30, 1965    J. DELLOUE    3,221,305
SUPERVISORY REMOTE CONTROL AND TELEMETERING SYSTEM
Filed Jan. 16, 1961    8 Sheets-Sheet 4
COINCIDENCE CIRCUIT
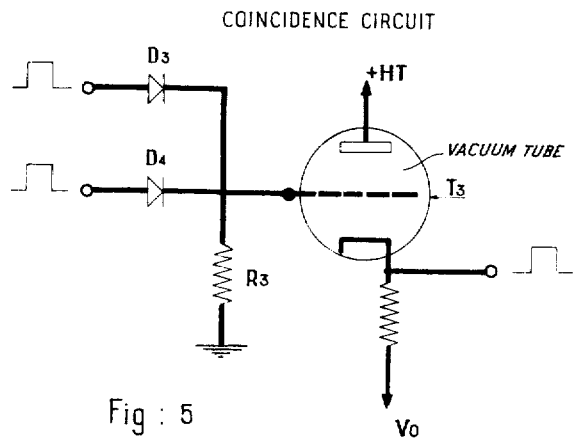
Fig: 5
BI-STABLE MULTIVIBRATOR
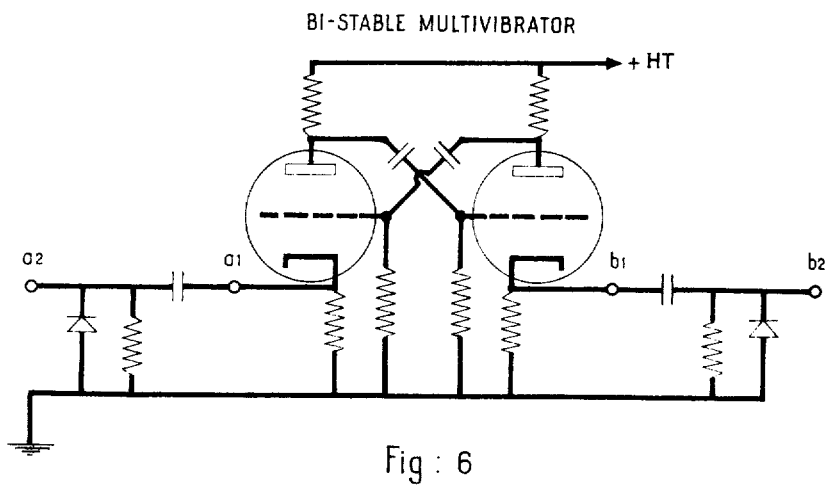
Fig: 6
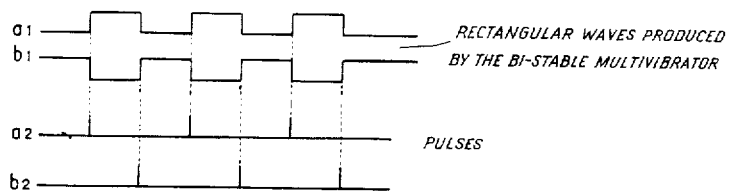
Fig: 7
INVENTOR
JEAN DELLOUE
BY Toulmin & Toulmin
ATTORNEYS

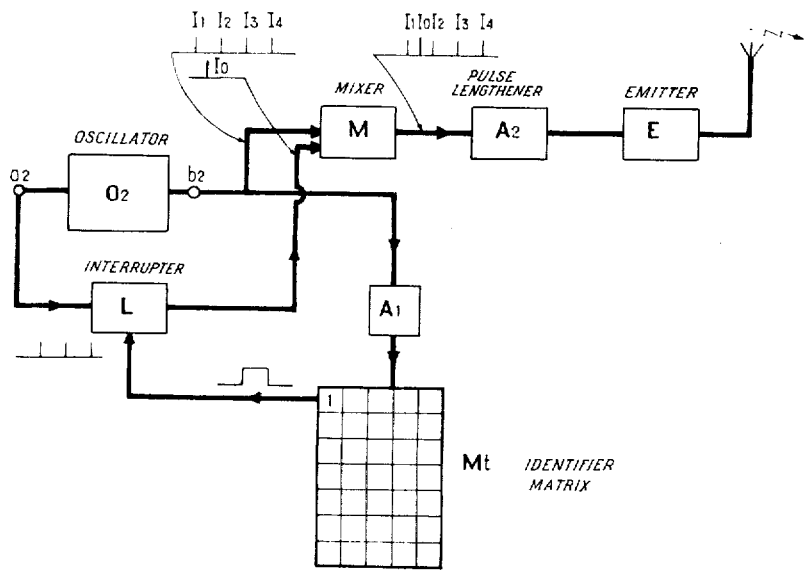
Fig: 8
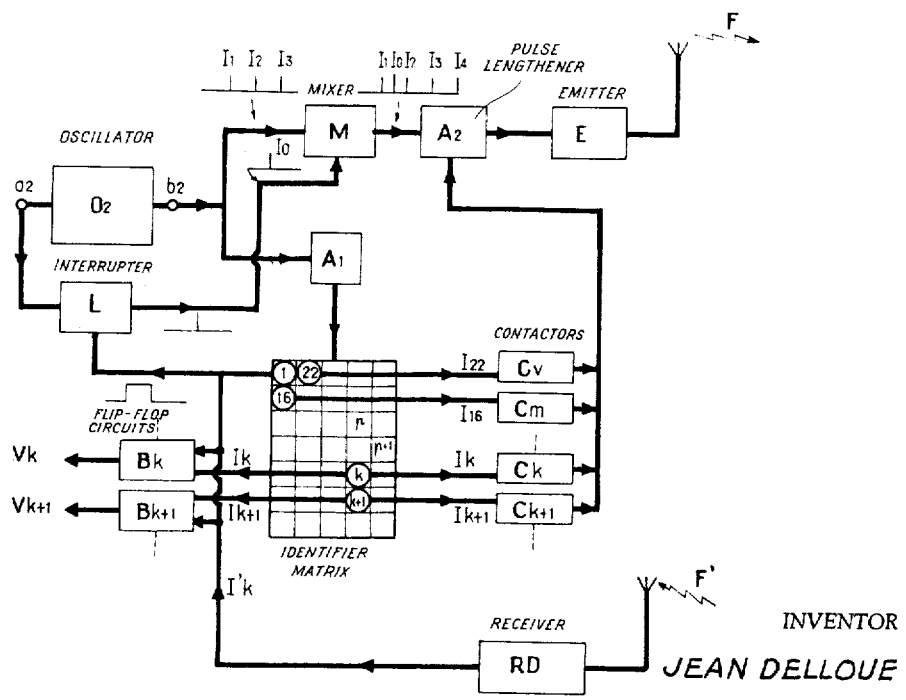
Fig: 9

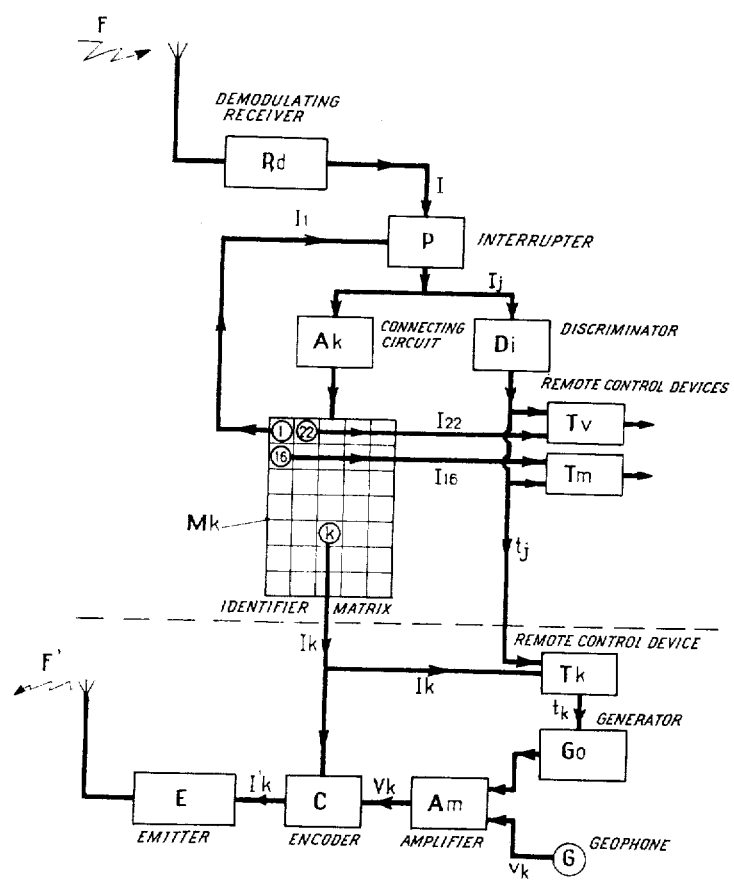
Fig: 12

Nov. 30, 1965     J. DELLOUE     3,221,305
SUPERVISORY REMOTE CONTROL AND TELEMETERING SYSTEM
Filed Jan. 16, 1961     8 Sheets-Sheet 7
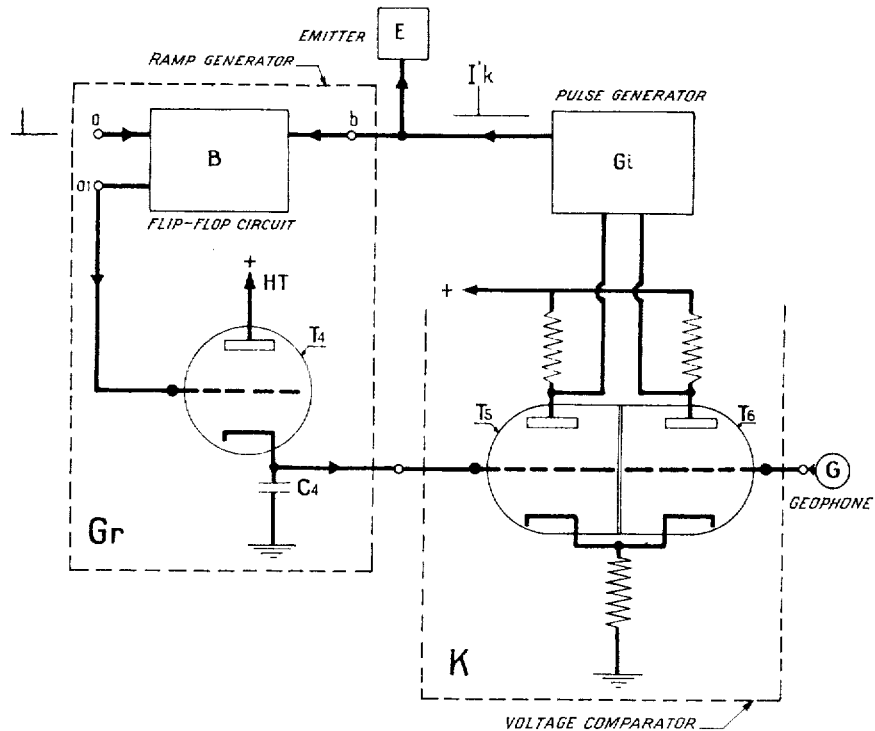
Fig: 13
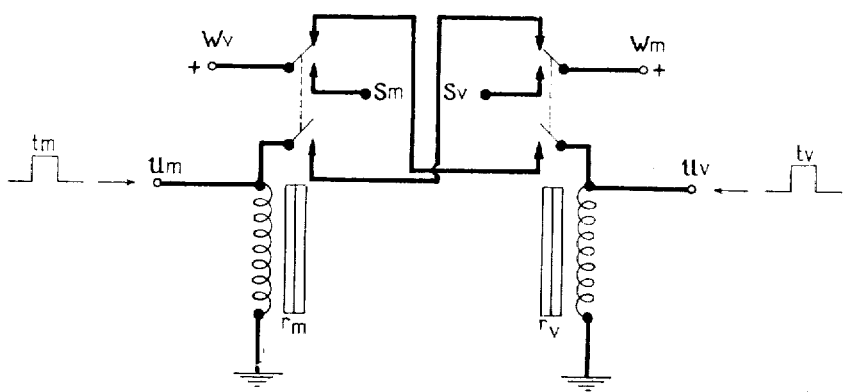
Fig. 16
INVENTOR
JEAN DELLOUE
BY *Toulmin & Toulmin*
ATTORNEYS

RETARDING DEVICE
(ONE-SHOT MULTIVIBRATOR)

PULSE LENGTHENER

United States Patent Office 3,221,305
Patented Nov. 30, 1965

3,221,305
SUPERVISORY REMOTE CONTROL AND
TELEMETERING SYSTEM
Jean Delloue, Fontenay-aux-Roses, France, assignor to Institut Francais du Pétrole, des Carburants et Lubrifiants, Paris, France
Filed Jan. 16, 1961, Ser. No. 95,448
Claims priority, application France, Jan. 20, 1960, 816,349
10 Claims. (Cl. 340—163)

The present invention relates to the transmitting of data or information, more particularly to a method and apparatus for transmitting data from a plurality of remote data sources by radio to a central station. The data from the sources has been previously coded in the form of a series of signals which signals are transmitted sequentially to the central station which then restores the signals received from all of the sources into a form of information which is usable.

In previous solutions to this problem the information obtained at the various sources or instruments must be either kept in a memory unit (for instance by recording on a magnetic tape or by using memory circuits or any other equivalent means) before their transmission in successive order to the central station, or transmitted on a particular frequency assigned to each transmitting or input source connected to one or more recording instruments, the various substations or input sources transmitting on different frequencies.

In the latter case the central base station must be provided with a plurality of receivers equal in number to the substations. Each of the receivers must be adapted for receiving waves from one determined individual substation at a given particular frequency. Such a system is, however, very complex and, in most cases, difficult to use since it requires radio-transmissions at different frequencies and, as a consequence, a central base station comprising equipment for selectively receiving each frequency which equipment is very complex and bulky.

The above complex of equipment is considerably simplified by the present invention which provides for the simultaneous transmission by radio-waves of series of information emanating from a plurality of instruments each of which is associated with a radio-transmitter (the same transmitter being connected to one instrument or even to several instruments when the instruments are located near to each other), under such conditions that the same frequency may be used at each of said transmitters. The problems of selectivity are thus eliminated.

The present invention may be used in all cases where several series of information must be transmitted simultaneously as well as for remote-controlled operation of instruments. Particular fields of application for this invention are:

Seismic prospecting;

Collecting partial information emanating from different radar screens of the same or different bases;

Collecting several series of data transmitted from one or more flying objects such as airplanes, rockets, missiles or from artificial satellites; and Collecting data from mobile engines such as cars, said data relating, for instance, to different operating conditions of the motor of the engine during tests on runway or roads, such as the pressure diagram, the sparking advance, the rotative speed of the crankshaft and the like.

In some applications, where information is simultaneously transmitted from a plurality of instruments, it may be necessary to frequently displace the central base station as well as the instruments and the transmitting substations associated thereto. This is particularly the case in seismic prospecting where the different signals transmitted by a great number of geophones located on the ground are to be recorded at a central base station. The geophones must be appropriately located to correspond to each location of the shot point and, consequently, when a new shot point is chosen, usually all, or at least a substantial number, of the geophones must be displaced together with the central base station. In such a case, the use of a great number of different frequencies, i.e., one for each channel, according to the conventional processes, would require a bulky and complex installation at the central base station, thus rendering the latter difficult to transport. It is probably for that reason that the most commonly used system in seismic prospecting consists of connecting each geophone through cables or wires to the recorder of the central base station. Generally, 24 or 32 geophones are used for converting the reflected elastic waves to electrical waves. An equal number of pairs of individual wires is thus required for practising said conventional method. These wires add weight to the equipment, are inconvenient to lay and to take up particularly on a hilly or rugged terrain, thus requiring extensive delays therefor, and are subject to deterioration or breaks which may prevent the making of part or all of the record.

The above-mentioned difficulties are amplified in water-covered areas where transportation is more difficult and greater trouble is experienced in laying and taking up the interconnecting cables of the system.

The difficulties and drawbacks hereabove mentioned in connection with the seismic method of prospecting may be obviated according to the present invention whereby an accurate recording at a central base station of the electrical waves obtained from a plurality of geophones is made possible even in areas where the terrain is such as to render difficult movement from one point to another.

According to the known processes of radio-transmission from a plurality of substations to a central base station by using a single frequency, the information was transmitted from the substations in sequence, which requires, in the seismic field, the use of memories at each substation.

This drawback is of particular importance in any applications where the information transmitted from the different substations must relate to the same instant, which may also be the case, for instance, in telemetering.

The above described disadvantages are eliminated in the present invention wherein the simultaneous transmission of information from the various remote instruments to a common measuring or recording unit is carried out by sequentially transmitting only one element of information from each of said instruments per cycle of interrogation. Thus, if $n$ is the number of instruments, the interval of time between the transmission of two successive elements of information from any one of said instruments to the measuring or recording unit of a base station will be at least equal to $n$ times the period comprised between two successive interrogations from said base station.

Since one of the most interesting fields of application of the present invention is that of seismic prospection, and that in such a use radio transmission greatly simplifies the procedure, a specific embodiment of the invention will be described more in detail with particular reference to that particular use although many other applications of the invention are possible.

In seismic prospecting, the electrical waves obtained at the output of each geophone which are to be transmitted to the central base station generally are of a relatively low frequency, for instance, lower than 100 cycles per second.

If $f$ represents said frequency and $n$ the number of geophones, and it is assumed that each period of the electrical waves produced by the geophones may be identified by 3 measurements, the minimum amount of elementary information to be transmitted per second to the central base station will be $3nf$ in order to restore at the latter the complete information originating from all the geophones.

For instance, to a value of $n=35$ and a frequency $f=100$, the minimum amount of elementary information to be transmitted per second to the central base station will be 10,500.

In such a case it is necessary that each elementary information be transmitted within an interval of time of about 100 microseconds.

These intervals of time within each of which an elementary bit of information must be transmitted from one of the geophones, are identified by means of pulses of very short duration time (e.g., 1 to 5 microseconds) produced by a pulse generator of the central base station.

It is therefore the principal object of this invention to provide a novel and improved apparatus and method for the simultaneous transmission of information from various remote instruments to a common measuring or recording unit.

It is another object of this invention to provide a radio transmitting and receiving system in which a plurality of transmittters is operating simultaneously and at the same frequency.

It is still another object of this invention to carry out simultaneous controlled operation of remotely located instruments by simultaneous transmission of orders from a single controlling station.

It is one of the main objects of this invention to provide an apparatus and method for seismic prospecting whereby a single common record of the substantially simultaneous arrivals of the seismic waves at spaced points may be achieved without the necessity of laying interconnecting cables or wires.

It is yet another object to provide apparatus and method for detecting elastic waves in the earth in relatively inaccessible areas and for receiving and recording in a common record the simultaneous arrivals of such waves at a plurality of widely spaced points.

Still another object is to provide a common seismic recording system for all electrical waves produced by a plurality of geophones at spaced points, which is easily transportable.

It is an additional object of this invention to provide for the simultaneous transmission to a central base station of information consisting of electric waves issuing from a plurality of geophone stations.

It is a further object of this invention to provide for such a simultaneous radio transmission without requiring the use at the central base station of a number of receiving units equal to the number of the substations.

It is still a further object of this invention to provide for such simultaneous radio transmission with the aid of a maximum of two different frequencies.

It is yet a further object of this invention to provide for the simultaneous radio transmission of a plurality of series of information from one or more mobile engines to a stationary central station.

Other objects and advantages of this invention will be apparent upon reference to the accompanying description when taken in conjunction with the following drawings, wherein FIGURE 1 diagrammatically shows an identifier matrix of a substation used for attributing a reference number to each pulse of a train, and comprising in combination two pulse-dividers respectively associated with a horizontal and a vertical line of flip-flop circuits whose output signals are supplied to coincidence circuits, each of which defines a compartment of the matrix;

FIGURE 2 represents the timing of the rectangular waves produced by the different flip-flop circuits;

FIGURE 2A indicates the reference number which is attributed to each compartment of the matrix;

FIGURE 3 shows schematically a pulse-divider;

FIGURE 4 represents a flip-flop circuit of the type used in an identifier matrix, as shown in FIGURE 1;

Figure 14:
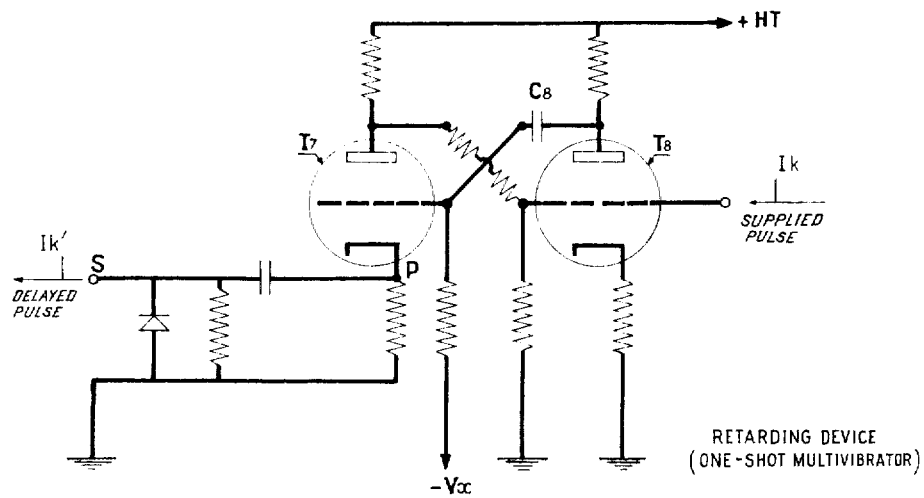
Figure 14:
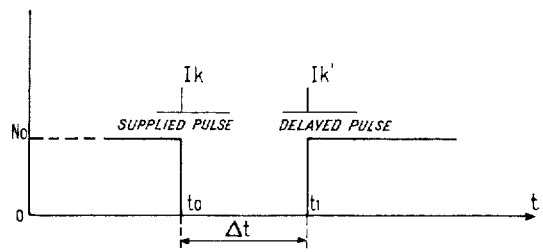
Figure 15:
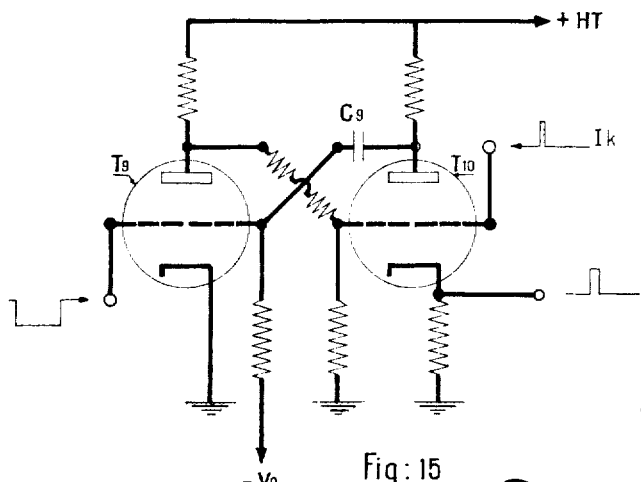

FIGURE 5 diagrammatically shows a coincidence circuit;

FIGURE 6 is illustrative of a bistable multivibrator circuit (of symmetrical configuration);

FIGURE 7 illustrates simultaneous rectangular waves of opposite signs obtained respectively at the two outputs of the multivibrator circuit of FIGURE 6 and the timing of the pulses derived therefrom;

FIGURE 8 diagrammatically shows a lay-out of a circuit which may be used at the central base station for producing synchronizing pulses which are radiated within the normal train of pulses;

FIGURE 9 gives a more complete block diagram of the central base station including the receiving device thereof;

FIGURE 10 represents a mixer for inserting the synchronizing pulses in the continuous train of pulses, which corresponds to the box M of FIGURE 8;

FIGURE 11 diagrammatically shows an interrupting device used in the receiver of each substation for eliminating the synchronizing pulse when the latter is attributed to the first compartment of the identifier matrix, said interrupting device having the reference P on FIGURE 12;

FIGURE 12 shows a lay-out of the circuitry at a substation;

FIGURE 13 represents an encoding device of the type used in the substations and corresponding to the box C of FIGURE 12;

FIGURE 14 illustrates a pulse-retarding circuit which may be advantageously used in connection with each compartment of the matrix at the central base station;

FIGURE 14A is a graph illustrating the time delay between pulses as achieved by the retarding circuit of FIGURE 14;

FIGURE 15 diagrammatically shows a pulse-lengthening device used in connection with the transmitting part of the central base station and corresponding to the box $A_2$ of FIGURES 8 and 9; and FIGURE 16 represents a double magnetically energized relay with holding contact used in connection with the receiving device of each substation in view of remote control of the same.

The method according to the present invention and the operation of an apparatus for carrying out the same, will be now described more in detail with reference to the above-mentioned drawings, wherein like reference symbols indicate the same parts throughout the various views.

A train of interrogating pulses is sent forth by the central base station at such a recurrence frequency as to transmit all of the information or data from all substations to the central base station. However, the corresponding interval of time between two successive pulses must be sufficient to transmit one elementary bit of information and that only one such elementary bit of information is transmitted during this time interval from only one of the instruments.

The pulses of this train are received by radio at each substation wherein they are classified in the order of their successive arrivals. Each substation is so arranged as to transmit each of its elementary bits of information originating from one instrument to the central base station exclusively when the reference number of a received pulse corresponds to the particular reference number of that one instrument having its output connected to said substation.

The reference numbers of the pulses may be comprised between 1 and $n+x$ in the case where, in addition to the information to be transmitted from the $n$ instruments, it is desired to allocate $x$ supplemental compartments of the matrix to the transmission of other signals such as, for example, signals for remote control of the substation and signals for synchronizing the various identifier matrices of the substations with that of the central base station.

Accordingly, the reference number of the Nth pulse in the train of interrogating pulses sent out from the central base station will be the remainder of the division of N by $n+x$. If this remainder is designed by the reference $k$, only the substation connected with the instrument having the reference number $k$ will be actuated by the Nth pulse and will, correspondingly, transmit one elementary bit of information to the central base station. Simultaneously, the N+1th pulse will actuate the substation connected with the instrument having the reference number $k+1$.

However, the carrying out of such a system requires identification by each substation of the reference number of each of the successive pulses sent out from the central base station. This identification is easily effected by means of an identifier matrix provided at each station (including the central base station) comprising a first divider associated with a horizontal line of interconnected flip-flop circuits receiving the train of pulses and delivering a new pulse of greater amplitude after receiving $m$ pulses of the train, a second divider associated with a vertical line of interconnected flip-flop circuits receiving the train of pulses and delivering a new pulse of greater amplitude after receiving $p$ pulses, $m$ and $p$ being integers incommensurable with each other, so selected that their product $mp$ be equal to the number of interrogating pulses of a complete cycle, i.e., $n+x$.

Thus, for instance, values of $m=5$ and $p=7$ (FIGURE 1) will correspond to a cycle of 35 pulses and to 35 compartments of the matrices (see FIGURE 2) which may be used in association with 32 instruments. One of the three remaining compartments may be allocated for synchronizing purposes and, for instance, the two other compartments for remote control of all the substations.

The dividers used are arranged so as to be operated by any pulse of the train regardless of the intervals between the successive pulses. A typical arrangement of such a divider is diagrammatically shown, by way of example in FIGURE 3. It comprises a vacuum tube $O_1$, the cathode of which is polarized (at a potential $V_o$) and having a grid circuit provided with a capacitor $C_1$, and a diode $D_1$, preventing any discharge of said capacitor into its feeding circuit. The grid potential required for firing the tube is so adjusted as to be higher than that resulting at the plates of the capacitor $C_1$ from the arrival of $m-1$ pulses and lower than that resulting from the arrival of $m$ pulses, where $m$ is the integer by which the number of pulses of the pulse train has to be divided (5 and 7 in the case of each of the aforementioned dividers).

As soon as the potential of the grid attains said firing potential, the vacuum tube is fired and provides at its output, connected to the plate circuit of the tube, a sharp pulse resulting from the discharge of capacitor $C_1$, whereby the divider returns to its initial state.

Figure 1:
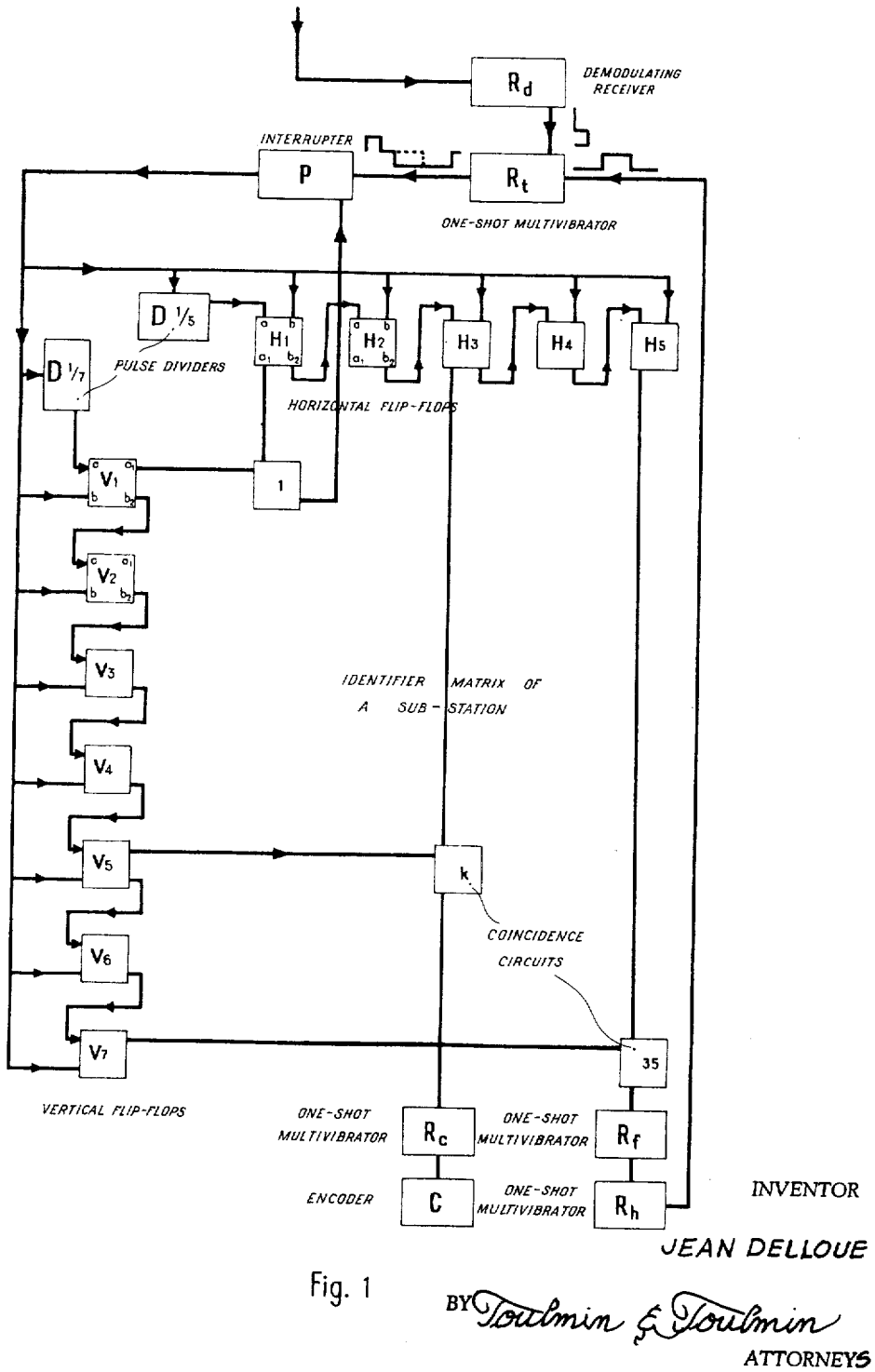

According to FIGURE 1, the divider by 5 is associated with five flip-flop circuits interconnected along a horizontal line and the divider by 7 to seven flip-flop circuits interconnected along a vertical line. A typical flip-flop circuit is represented in FIGURE 4. It comprises two vacuum tubes $T_1$ and $T_2$ each having its plate connected through a resistor to the grid of the other. In such a circuit only one tube may conduct since conduction through one tube ($T_1$ for instance) disconnects the other tube $T_2$. The flip-flop circuit is thus in a first stable state $S_1$. When a positive pulse of sufficient voltage is applied to the grid $b$ of $T_2$, a very quick regenerating process takes place providing conduction through $T_2$ and disconnecting $T_1$. The circuit thus remains in a second stable $S_2$ until a new positive pulse is applied to the grid $a$ of $T_1$ and so on.

If two positive pulses of different amplitudes are simultaneously applied to the grids $a$ and $b$ of the two tubes, only the pulse of higher amplitude will trigger the system.

When tube $T_1$ conducts (state $S_1$), a positive potential is obtained at point $a_1$ of the cathode circuit of $T_1$, whereas when $T_1$ is at rest (state $S_2$), the potential at point $a_1$ is zero. Similarly a positive potential will be obtained at point $b_1$ exclusively when $T_2$ conducts. Thus, a positive rectangular wave at point $a_1$ will correspond to each state $S_1$ and to each state $S_2$ a positive rectangular wave at point $b_1$. A capacitor $C_2$ coupled with a resistor $R_2$ diverts said latter rectangular wave obtained at $b_1$ into two pulses of opposite polarity. A diode $D_2$ is so oriented as to only transmit the negative pulse and neutralize the same by a short to ground. Consequently, only a positive pulse is obtained at point $b_2$ when $T_2$ is fired i.e., when the system is passing from state $S_1$ to state $S_2$. Said positive pulse may be used for controlling other flip-flop circuits.

Each of the flip-flop circuits is supplied at point $b$ with pulses provided by the receiver, after demodulation of the same and, at point $a$, with pulses of higher amplitude emanating from the pulse divider or from the preceding flip-flop circuit (positive pulse issuing at point $b_2$).

If, in a continuous train of pulses, the first pulse is referred to as $I_1$, after the passage of the 5th pulse $I_5$ the divider by 5 supplies a pulse at point $a$ of the flip-flop circuit $H_1$ (FIGURE 1). This latter pulse being of higher amplitude than the pulse of the train received at point $b$, circuit $H_1$ is triggered. At the arrival of the 6th pulse of the train, $H_1$ is triggered back to its initial state and simultaneously supplies a new pulse from point $b_2$ to point $a$ of $H_2$. Since said new pulse is of a higher amplitude than the 6th pulse $I_6$ of the train, which is simultaneously received at point $b$ of $H_2$, the latter is triggered. After receipt of the 7th pulse $I_7$, $H_2$ is triggered back to its initial state and supplies a new pulse to point $a$ of $H_3$ and so on.

As a result, point $a_1$ of $H_1$ will provide rectangular waves having a length corresponding to the interval between two successive pulses of the train ending respectively at the receiving of the pulses $I_2$, $I_7$, $I_{12}$, $I_{17}$ . . . of the train, point $a_1$ of $H_2$ will provide rectangular waves of the same length ending respectively at the receiving of the pulses $I_3$, $I_8$, $I_{13}$, $I_{18}$ and so on. Similarly, the flop-flop circuits $V_1$, $V_2$, $V_3$, $V_4$, $V_5$, $V_6$ and $V_7$, disposed along a vertical line, will provide rectangular waves ending respectively at the receiving of pulses $I_2$, $I_3$, $I_4$, $I_5$, $I_6$, $I_7$ and $I_8$ or of pulses the reference number of which, divided by 7, gives a remainder of 2, 3, 4, 5, 6, 7 or 1, respectively.

A coincidence circuit is branched on two flip-flop circuits, one of the horizontal line ($H_1$, $H_2$, $H_3$, $H_4$, $H_5$) and one of the vertical line ($V_1$, $V_2$, $V_3$, $V_4$, $V_5$, $V_6$, $V_7$) and supplies a rectangular wave when both flip-flop circuits to which it is connected simultaneously provide a rectangular wave at their terminals $a_1$.

A coincidence circuit of this type, as illustrated in FIGURE 5, comprises two diodes $D_3$ and $D_4$ through which is fed a common resistor $R_3$. A positive rectangular wave passing through diode $D_3$ or diode $D_4$ would result in a positive rectangular wave of the same amplitude A between the terminals of resistor $R_3$. Two of such positive rectangular waves concurrently passing through diodes $D_3$ and $D_4$ respectively would result in a positive rectangular wave having substantially a double amplitude (2A). The output of such a coincidence circuit is connected to the grid of a vacuum tube $T_3$ polarized at a convenient value, said value being adjusted, for instance, so that a rectangular wave is to be obtained on the cathode of $T_3$ only when two concurrent rectangular waves are applied respectively through $D_3$ and $D_4$ to the grid of $T_3$, a single rectangular wave being insufficient for firing the tube.

Each coincidence circuit, which corresponds to a compartment of the matrix, will thus be actuated exclusively by a pulse having the same reference number as that of said compartment. As shown by FIGURE 2A the reference numbers of the different compartments of the matrix may be easily derived from the diagram of the rectangular waves produced at the receiving of the successive pulses of the train.

In the case illustrated by FIGURE 2, corresponding to an interrogation cycle of 35 pulses, to the 1st, 36th, 71st, 106th . . . pulses will be attributed the reference number 1, to the 2nd, 37th, 72nd, 107th . . . pulses, the reference number 2 and so on.

As it is very improbable that at the moment when the apparatus enters into operation, the identifier matrices of the various substations will start their numbering cycle with the same pulse, it is necessary to provide for a synchronizing automatic system by means of which the same reference number is allocated to any given pulse of the train by the various substations and the control base station.

Such a synchronizing device will also permit restoring the correspondence between the pulses and their reference number when the latter has been destroyed in the course of operation due to a disturbing external phenomenon (lacking pulse as a consequence of a vanishing of the radio transmission, supplementary pulse created by a thunder lightning having an effect upon the carrier frequency of the interrogating pulses).

Any discordance between the reference numbers allocated to the same pulses by the different identifier matrices at the substations and the central base station would result in a complete disturbance of the sequential transmission of the signals to the central base station in view of the fact that the interrogating pulses are controlling the sequential order of the response-signals, the response signal emanating, for instance, from the instrument having the reference number $k+1$ being thus interpreted as pertaining to the set of pulses previously recorded as corresponding to the instrument of reference number $k$.

Such a disturbance is avoided according to this invention by automatic synchronization of the different matrices so that the same reference number is allocated by the different matrices to each pulse.

This automatic synchronization device provides identification of each pulse $I_1$ (having 1 as reference number) by creating a supplementary pulse $I_0$ which is inserted within the interval between pulses $I_1$ and $I_2$. Accordingly, a supplementary pulse is added to each cycle of 35 pulses, within the normal intervals between $I_1$ and $I_2$, $I_{36}$ and $I_{37}$, $I_{71}$ and $I_{72}$, $I_{106}$ and $I_{107}$ and so on, respectively.

This addition of a supplementary pulse may be carried out in the following manner:

The central base station (FIGURES 8 and 9) is provided with an oscillator $O_2$ which may advantageously consist of a multivibrator corresponding substantially to a flip-flop circuit wherein the coupling of the tubes by means of resistors is replaced by a coupling of capacitors.

Due to this new coupling of the tubes the states $S_1$ and $S_2$, as hereabove defined in connection with the operation of the flip-flop circuit, are only maintained for a definite time which is constant and depends only on the specific characteristics of the multivibrator circuit.

In the case of a multivibrator of symmetrical configuration of the type shown in FIGURE 6, the terminals $a_1$ and $b_1$ of the latter are supplying two series of rectangular waves at regular intervals, which are in phase, of the same magnitude, but of opposite polarities, i.e., which are such that their algebraic sum is constant. To these two series of rectangular waves of symmetrical configuration will correspond the supplying at the terminals $a_2$ and $b_2$ of two trains of equidistant pulses so related to each other that each pulse of one train is produced exactly at midway of the interval between two successive pulses of the other train (see FIGURE 7).

The train of pulses issuing at terminal $b_2$, for instance, is then supplied through a connecting circuit $A_1$ to the identifier matrix $Mt$ having $n+x$ compartments (see FIGURES 8 and 9) at the compartment 1 from which a rectangular wave is delivered during the interval between pulses $I_1$ and $I_2$. This rectangular wave is supplied to an interrupting device L giving way to one of the pulses of the train issuing at $a_2$, said pulse occurring within the interval between the pulses $I_1$ and $I_2$.

This interrupting device L may consist of a coincidence circuit of the same type as that already described with reference to FIGURE 5 but having the polarization of its vacuum tube so adjusted that it does not conduct in the absence of pulses arriving through $D_3$ or $D_4$ and is very close to the firing conditions when the rectangular waves issuing from compartment 1 of the identifier matrix is applied to its grid, through diode $D_3$, for example. The train of pulses issuing from $a_2$ being applied to the grid of the tube through $D_4$, only that pulse of this train occurring in synchronism with said rectangular wave will provide the firing of the tube and consequently issuance of a new pulse at the cathode circuit of this tube.

According to this latter arrangement the supplementary synchronizing pulses are produced exactly at the middle of the interval between two successive pulses of the train.

However, the synchronizing pulse may as well be placed at any position intermediate between pulses $I_1$ and $I_2$. This may be achieved, for instance, by actuating a one-shot multivibrator circuit by means of the leading edge of the rectangular wave issuing from compartment 1 of the matrix. The one-shot multivibrator circuit may be of the type shown in FIGURE 14, for example, and provides a pulse lagging said leading edge by the desired time interval which, in turn, actuates a second one-shot multivibrator, giving rise to a pulse of the desired length. Whatever may be the arrangement for providing the synchronizing pulse and the positioning of the latter within the interval between $I_1$ and $I_2$, said pulse is supplied, together with the normal train of pulses issuing from $b_2$, to the mixer M wherein it is inserted in said train, thus providing at the output of the mixer a composite train of pulses which, through a pulse-lengthening device $A_2$ (in view of further operations as hereinafter explained) is supplied to the transmitter E of the central base station from where it is radiated after modulation of the same at the carrier frequency F (FIGURE 9).

The mixer M of FIGURES 8 and 9 may be of the type shown in FIGURE 10 consisting of two diodes $D_5$ and $D_6$ connected to a common resistor $R_4$ in the same manner as in the coincidence circuit of FIGURE 5. There is thus obtained at the terminals of $R_4$ a positive pulse each time a pulse is provided through either $D_5$ or $D_6$.

What ever may be the positioning of the supplementary pulses within the interval between pulses $I_1$ and $I_2$, said supplementary pulse will serve in all the sub-stations to identify the pulses $I_1$ and $I_2$ and consequently all successive pulses by their reference number in the cycle.

After demodulation of the carrier frequency in the demodulating receiver $Rd$ of a substation $k$ (FIGURE 12), the received train of pulses is applied through a connecting circuit AK to the identifier matrix $Mk$ of said substation which will allocate the right reference number to each pulse of a cycle without any risk of error, since identification of the pulse $I_1$ (first pulse of a cycle) is made sure by means of the supplementary pulse $I_0$ in the interval between $I_1$ and $I_2$, even if an external perturbation disturbs the normal order of arrival of the pulses.

To this effect compartment 1 of the matrix of each substation, to which must be allocated the first pulse of each cycle, is connected to an interrupting device P, through which the demodulating receiver $Rd$ is also connected to the matrix $Mk$. Said interrupting device P disconnects the matrix for a time slightly longer than the interval between the trailing edge of the pulse $I_1$ and the trailing edge of the supplementary pulse $I_0$.

This interrupting device, which performs an operation exactly inverse from that of the interrupter L, may also consist of a coincidence circuit of the type shown in FIGURE 5, wherein one of the diodes is oriented in opposite direction from that of the other and the polarization of the tube so adjusted that, in the absence of pulses on its grid the tube is very close to its firing conditions. Such an interrupting device is shown by way of example in FIGURE 11.

The positive rectangular wave issuing from the compartment 1 (FIGURE 12) of the identifier matrix M$k$ is converted to a negative rectangular wave beginning substantially concomitantly to the trailing edge of the pulse $I_1$ or in the close vicinity thereof and having a total duration which is slightly longer than the time interval between the first pulse $I_1$ and the synchronizing pulse $I_0$, which negative rectangular wave is applied to the circuit according to FIGURE 11 through the diode $D_7$. The train of pulses issuing from the demodulating receiver R$d$ (FIGURE 12) is applied to the same circuit through the diode $D_8$.

In the absence of a negative rectangular wave applied to $D_7$, any pulse arriving through the diode $D_8$ will fire the tube (FIGURE 11) and will result in positive pulses on the cathode of the latter. But when a negative rectangular wave is applied to $D_7$, any pulse arriving concomitantly through $D_8$ is insufficient for firing the tube and, consequently, no corresponding pulse will be obtained on the cathode of the tube.

The negative rectangular wave applied to $D_7$ may be easily obtained from a one-shot multivibrator circuit actuated by the leading edge of the rectangular wave issued from compartment 1 of the matrix M$k$. The rectangular wave is picked up at a plate of that element of the multivibrator which is fired by said leading edge and its length being dependent on the selected characteristics of the multivibrator circuit.

Since the length of the negative rectangular wave has been chosen so that the supplementary pulse $I_0$ occurs during the corresponding interval, the latter is suppressed each time when the pulse $I_1$ is allocated to compartment 1 of the matrix. On the contrary, if a pulse I$k$ (having the reference number $k$) is allocated to compartment 1 as the result of a disturbance, no effect can be achieved by the interrupting device since no supplementary pulse is provided between pulses I$k$ and I$k+1$. Consequently, the interrogation cycle will be increased by one pulse.

As the identifier matrix has no more than $n+x$ compartments, corresponding to a normal cycle of $n+x$ pulses, and the dividers are operated by each pulse whatever may be the interval between the successive pulses, the pulse allocated to compartment 1 of the matrix at the next cycle will be that referred to as I$k-1$. After $k$ cycles the pulse $I_1$ will again be allocated to the compartment 1 and, as a result of the operation of the interrupting device P, which suppresses the supplementary pulse $I_0$, will remain allocated to said compartment 1, the number of the pulses in a cycle being now equal to the number of compartments of the matrix (i.e., $n+x$).

The combined action of the supplementary pulse $I_0$ with the interrupting devices P associated with compartments 1 of the matrices of the different substations thus provides a perfect synchronization of the allocation of the reference numbers to the pulses by said matrices; the restoration of a working in phase of the latter being entirely automatic.

The delay required for such a restoration of the synchronized operation of the matrices, following any disturbance, will be at most equal to the duration of $n+x$ cycles, thus corresponding to the time required for emitting $(n+x)^2$ pulses of the train.

With a frequency of the pulses of $3(n+x)f$, wherein $f$ represents the maximum frequency of the information to be transmitted from the substations, the delay required for restoring the synchronization will be of $$\frac{n+x}{3f}$$

seconds (e.g., with $n+x=35$ and $f=100$, of about one tenth of a second).

During the corresponding period all the transmitting channels (radio transmissions between each substation and the central station) will be disturbed. Although this period of disturbance is relatively short in most cases, as it may be appreciated from the above indications, it is, however, desirable to avoid as much as possible any incidence of parasitic supplementary pulses, for instance, by emitting from the central base station pulses of high peak voltage.

It must be observed that the disturbance affecting the waves transmitted by the central base station of a frequency F produce far greater troubles than the disturbances affecting the waves at the frequency F', transmitting a response from each substation to the central base station. In the latter case, said disturbances cannot affect more than the limited number of channels of said substation, i.e., the transmission to the central station of the information from the instruments associated with said substation.

It is furthermore necessary, for occurrence of such a disturbance, that the parasitic pulse be created at the moment corresponding to the time interval between the receiving of an interrogating pulse I$k$ and the sending of the corresponding response-pulse I'$k$. If the parasitic pulse occurs within the time interval between the response-pulse I'$k$ and the following interrogation pulse $I_{k+1}$ the channel $k$ will not be disturbed. Moreover, occurrence of a disturbance resulting from a parasitic pulse is not of considerable importance since it could not affect more than one elementary bit of information which, in case of seismic prospecting, does not correspond to more than ⅓ or ¼ of the information data used for identifying one cycle of oscillation, and the latter may be easily restored at the central base station.

Due to the synchronizing device, a substation connected to instruments having the reference number $k$ and $k+1$ for instance is only actuated by the pulses having the same reference numbers, I$k$ and $I_{k+1}$. It is therefore unnecessary to provide the matrix of said substation with coincidence circuits other than that corresponding to compartments 1 (for synchronization) 16 and 22 (for remote control of all substations), $k$ and $k+1$ (for receiving the interrogating pulses I$k$ and $I_{k+1}$ devoted to the considered substation). Accordingly, it is also unnecessary to provide each substation with the entirety of of the flip-flop circuits H and V. It may suffice that each substation is provided with the minimum number of flip-flop circuits required for actuating the coincidence circuits corresponding to the matrix compartments 1, 16, 22 and the compartments having the reference numbers of the instruments associated with said substation. It may be seen, for example, in FIGURES 1 and 2A of the accompanying drawings relating to the case of a cycle comprising 35 interrogating pulses, that a substation having a single instrument of reference number 2, does not need more than four flip-flop circuits ($H_1$, $H_2$, $V_1$ and $V_2$) and that the substation having a single instrument of reference number 24 may be operated with only eight flip-flop circuits ($H_1$, $H_2$, $H_3$, $H_4$, $V_1$, $V_2$, $V_3$) whereas the substation having the channel 35 must be equipped with a total number of twelve flip-flop circuits ($H_1$ to $H_5$ and $V_1$ to $V_5$).

In each substation a device is provided in view of the transmission of an information element to the central base station as soon as the pulse having the reference number of a channel of the station has been received by the latter.

This device comprises an encoder C (FIGURE 12) which is connected to the output of the coincidence circuit constituting the compartment $k$ of the matrix and is actuated by the latter at the arrival thereon of the corresponding pulse I$k$. Said encoder comprises a ramp generator G$r$ (FIGURE 13) providing a linearly increasing voltage as a function of time, which is actuated by the pulse I$k$, and a voltage comparator K actuating a pulse generator G$i$ upon coincidence of the voltage levels of the information signal emanating from a geophone G, eventually after amplification by the amplifier A$m$, and the ramp provided by generator G$r$.

The operation of such an encoder will be further described more in detail with reference to one particular lay-out of the same shown by way of example in FIGURE 13.

The rectangular wave issuing from the coincidence circuit corresponding to the compartment of reference number $k$ of the identifier matrix is converted by means of a resistor-capacitor circuit of the type shown in FIGURE 4, to a positive pulse which is applied to one of the terminals (a) of the flip-flop circuit B (FIGURE 13). This pulse triggers the flip-flop circuit, which produces at the terminal $a_1$ of the latter, a positive voltage of sufficient magnitude for providing conduction of a tube T$_4$, disconnected at rest. This tube T$_4$ comprises in its cathode circuit a capacitor C$_4$ which is progressively charged during the period of conduction of the tube, so that the potential difference between its plates increases according to an exponential law, which, at the beginning of the charge period, may be easily adjusted so as to be very close to a law of linear increase, by selection of appropriate values and characteristics of the circuit.

This voltage, substantially linearly increasing as a function of time is compared with the voltage provided at each moment by the geophone G of the substation (after eventual preamplification) by means of a voltage comparator K consisting of two vacuum tubes T$_5$ and T$_6$ connected to each other in a differential stage lay-out.

There is thus obtained between the plates of the two tubes T$_5$ and T$_6$ a voltage proportionate to the difference between the voltage ramp provided by the capacitor C$_4$, having a constantly increasing slope, and the voltage value of the signal emanating from the geophone G of the substation.

This voltage obtained between the plates of the two tubes is amplified so as to make possible an accurate determination of the moment at which it is nullified, i.e., the moment at which the constantly increasing voltage provided by the capacitor C$_4$ becomes exactly equal to the voltage value of the signal issuing from the geophone, which voltage value constitutes one of the samples, representative of the corresponding oscillation cycle. At that moment the generator G$i$ provides a pulse I'$k$ which is transmitted to the transmitter E of the substation and to the terminal $b$ of the flip-flop circuit B, thereby disconnecting the latter.

The voltage at the terminal $a_1$ of B being thus nullified, the tube T$_4$ is in turn disconnected and the capacitor C$_4$ is discharged so that the encoding device is brought again to its initial state and is ready for operation at the occurrence of the next cycle of interrogating pulses.

This encoding device, as hereabove described, provides for the conversion of a peak-voltage variation of the signal issuing from the geophone to a proportionate variation of the time interval between the interrogating pulse I$k$ and the corresponding response-pulse I'$k$, which latter variation is more easily transmittable particularly by radio-waves, to the central base station.

As a matter of fact, since the voltage provided by the capacitor C$_4$ of generator G$r$ varies in proportion to the time, the interval of time between the interrogating pulse I$k$ and the response-pulse I'$k$ is a linear function of that voltage value which is representative of the elementary information to be transmitted. The response-pulse I'$k$ is transmitted to the central base station by the carrier waves at the frequency F' used for modulation, this frequency being the same for all substations.

At the central base station (FIGURE 9), the single receiver of which is adapted for receiving waves at said frequency F', the pulse I'$k$, obtained after reception and demodulation of the carrier waves by the demodulating receiver RD, triggers back to its initial state the flip-flop circuit B$k$ previously triggered by the pulse I$k$ issuing from the compartment $k$ of the identifier matrix of the central base station. The working of the flip-flop circuit thus lasts over the interval of time between creation of the pulse I$k$ and receiving of the pulse I'$k$ at the central base station.

With the exception of a constant delay, corresponding to the duration of the transmission by radio-waves from the central base station to the substation and back, the working delay of the flip-flop circuit B$k$ and, consequently, the value of the voltage V$k$ obtained at the output of B$k$ is proportional to the voltage value measuring the information element transmitted by the substation $k$.

After passage through a low-pass filter so as to eliminate the pulse's own frequency, the remaining oscillations at the lower frequency, corresponding to the information transmitted by the substation, are isolated. In the case where three information elements are transmitted per each cycle of oscillation, the frequency of the pulses used for coding said elementary information is of three times that of the oscillations to be transmitted and the latter may therefore be easily isolated by means of the low-pass filter.

From a general point of view the higher the number of information elements to be transmitted per cycle the easier the elimination of the own frequency of the pulses. In practice this elimination is carried out satisfactorily when transmitting three information elements per oscillation cycle. It must be observed that the demodulated signal always comprises a constant value in each channel $k$, corresponding to the delay for transmission of radio-waves from the central station to the substation associated with the instrument $k$ and back. This constant value may be easily eliminated by means of a rudimentary high-pass filter.

It seems necessary, at first sight, that the pulse I'$p$ is received at the central base station before transmission from the latter of the next interrogating pulse I$_{p+1}$ since otherwise the pulse I'$p$ would disconnect the flip-flop circuit which has been triggered by the interrogating pulse I$_{p+1}$ and the corresponding signal would be allocated to the channel $p+1$ when recorder at the central base station.

Such receiving of the response-pulse I'$p$ at the central base station before emission by the latter of the interrogating I$_p$+$_1$ implies that the time interval between I$p$ and I'$p$ must be lower than the time interval $t$ between two successive interrogating pulses sent by the central base station.

The maximum interval between two successive interrogating pulses which may be allocated for coding the information element, hereinafter designated by reference $t_1$, will depend on the distance $d$ between the substations and the central base station. The delay $t_2$ required for the transmission by radio-waves at said distance $d$ and back is given by the formula:

$$t_2 \text{ (second)} = \frac{2d(Km)}{300.000}$$

Since $t_1 = KV_p \leq (t - t_2)$, wherein $V_p$ is the voltage measuring the information element transmitted from the substation $p$ and K a coefficient; the maximum value of said coefficient K will be determined by the equation:

$$K < \frac{t - \frac{2d(Km)}{300.000}}{V_p(\text{max.})}$$

From the relation $t_2 < (t - t_1)$ it may be deduced:

$$d(Km) < 150.000(t - t_1).$$

In the above-considered case, where the interrogation cycle comprises 35 pulses and the oscillations to be transmitted have a frequency of about 100 c.p.s. and are each identified by three samples, the value of $t$ is equal to about 95 microseconds.

If it is considered that 25 microseconds are sufficient for coding the signal, the maximum distance between the substation and the central base station will be:

$$d \text{ max.} = t - t_1 \times 150.000 = \frac{95 - 25}{1.000.000} \times 150.000 = 10.50 Km$$

This limitation concerning the distance $d$ is not, however, strictly necessary. It may suffice that all substations be placed at such distances from the central base station that each of the response-pulses, for instance $I'_p$ arrives at the central station between emission from the latter of two interrogating pulses $I_{p+n}$ and $I_{p+n+1}$, the order of the receiving of the response-pulses at the central base station being unchanged. In such a case the response-pulse $I'k$ transmitted from the substation connected to the instrument $k$ will be identified at the central base station as emanating from the channel $k+n$ and similarly the response pulse $I'_{k+1}$ will be identified as emanating from the channel $k+(n+1)$. Restoration of the right correspondence between the response-pulses and the channels may be easily obtained by effecting a mere cyclic permutation from $n$ intervals, for instance, by means of a revolving switch.

In view of facilitating the establishing of such correspondence, one of the substations is caused to emit a particular identifying signal which, by adjustment of the revolving switch is allocated to the right corresponding channel at the recorder of the central base station.

Accordingly, the only condition concerning the distance between each of the substations and the central base station is that said distance $d$ responds to the condition:

$$150.000(nt - t_1) < d < 150.000[(n+1)t - t_1]$$

wherein $n$ is an integer equal to or higher than zero. This condition defines, with $n > 0$, a series of annular areas around the central base station such that all of the substations must be placed within one of said areas. In the case where all substations are lined up, which is usual in seismic prospecting, it may be of interest to place the central base station on the mediatrix of the straight line segment along which are placed geophones and at such a distance from the latter than the difference between the distances from the central base station to the farthest substation, on one hand, and to the nearest substation, on the other hand, is not too great.

Such a disposition is also of advantage since any risk of saturating the receivers of some of the substations by the waves emitted from the central base station or viceversa, which saturation will occur when the central base station is lined up with the substations, is thereby avoided.

It must be observed that, in seismic prospecting, the conditions hereabove set forth concerning the distance $d$ from the substations to the central base station are generally fulfilled by means of an appropriate positioning of the central base station since the geophones are lined up over a distance which is not greater than 15 kilometers.

Moreover, it is still possible to avoid any limiting conditions relating to the distance $d$, whatever may be the frequency of the oscillations which must be transmitted to the central base station, when the substations are emitting on a carrier frequency which is different from that used in the central base station. This may be achieved by connecting each flip-flop circuit $Bk$ of the central base station to the corresponding compartment $k$ of the matrix of the latter through a pulse-retarding device so adjusted as to delay the interrogating pulses of the reference number $k$ by an interval of time corresponding exactly to the transmission time of the radio-waves from the central base station to the substation $k$ and back.

The delay required for transmitting radio-waves is thereby exactly balanced for each substation by a corresponding retardment and the total interval between two successive interrogating pulses may consequently be used for coding purposes. By this way it is also possible to avoid any limitation as to the place of the substations, which may consequently be chosen at will.

Such a retarding device may be realized, for example, according to the diagram of FIGURE 14. A positive pulse, obtained from a rectangular wave provided by compartment $k$ of the matrix of the central base station, by means of a differentiating circuit of the type shown in FIGURE 6, is applied to the grid of the vacuum tube $T_8$, which is connected to another tube $T_7$ by means of a coupling resistor and a coupling capacitor $C_8$ so as to constitute a one-shot multivibrator. Since the tube $T_7$ is normally conducting, when a positive pulse is applied to the grid of tube $T_8$, $T_8$ is fired, and a very rapid regenerating process occurs which keeps $T_8$ conducting while disconnecting $T_7$.

However, after a certain delay, the capacitor $C_8$, which has been previously charged, is progressively discharged so that the grid potential of $T_7$ reaches again a sufficient value for firing this tube, which results in a new regenerating process, at the end of which the system is returned to its initial state ($T_7$ disconnected).

By adjusting the value of the capacitance of $C_8$, as well as other constant values of the circuit, the duration of a cycle may be determined at will. However, it may be of interest to provide for such an adjustment of the duration of the cycle without modifying these characteristics of the circuit but more simply by applying to the grid of $T_7$ a negative voltage of adjustable value $-V_x$.

The more negative is the voltage $-X_x$ the longer is the duration $\Delta t$ of the discharge of the capacitor which is necessary for bringing back the potential of the grid of $T_7$ to the firing value.

Accordingly, by a mere adjustment of the voltage $-V_x$, the length of the interval $\Delta t$ during which $T_8$ conducts and $T_7$ is disconnected may be determined at will.

At the instant $t_0$ of the arrival of the pulse $Ik$ on the grid of $T_8$, the latter starts conducting and $T_7$ is disconnected. At this moment the potential at point P of the cathode circuit of the tube $T_7$ drops abruptly from its initial value of $N_0$ (when $T_7$ conducts) to zero (see FIGURE 14A) The tube $T_7$ will not conduct again until the instant $t_1$ after a relay $\Delta t$ after $t_0$, the interval of time $\Delta t$ being adjusted by varying the negative potential $-V_x$. At said instant $t_1$ the potential value at point P will be abruptly increased to its initial value $N_0$. The differentiating circuit comprising a resistor coupled with a capacitor and a diode, which is placed between points P and S (FIGURE 14) will convert each abrupt increase of potential at point P to a positive pulse $I_{k'}$, the leading edge of which is lagging the leading edge of the pulse $Ik$ by a time interval of $\Delta t$. This new pulse $I_{k'}$ (FIGURE 14A) will be supplied to the flip-flop circuit $Bk$ only when a time interval $\Delta t$ is elapsed after issuance of a rectangular wave from the compartment $k$ of the matrix at the central base station (FIGURE 9).

This time interval $\Delta t$ may be adjusted to a different value for each channel so as to obtain, at the output of each flip-flop circuit $Bk$, rectangular waves, the lengths of which are exactly representative of the signals transmitted from the corresponding substation.

Such a retarding device is, however, not applicable in the case where the frequency of the waves emitted by the central base station is the same as that used for transmitting information from the substations, since, in such a case, the receiver at the central base station would be saturated by the emission from the same, which prevents any reception during the emission period.

In view of operating radio-transmissions from the central base station to the substations and vice versa by using the same carrier frequency it is necessary to disconnect the receivers at the substations during the interval of time between the receiving of an interrogating pulse at the farthest station (from the central base station) and the emission of the next interrogating pulse. This time interval between which the receivers of the substations are disconnected may, however, be reduced, if desired, to the coding time at the substations increased by the transmission delay of radio-waves over a distance corresponding to the difference between the distance from the base station to the farthest substation and the distance from the base station to the nearest substation, provided hat the receiver at the base station is disconnected when a delay corresponding to the transmission of radio-waves from the base station to the farthest substation is lapsed after the end of the delay used for coding purposes.

Disconnection of the receivers of the substations as soon as an interrogating pulse has been received by said substations associated with the retarding of the beginning of the emission from each substation by means of a one-shot multivibrator $R_c$ (FIGURE 1), at least until the farthest substation has received this interrogating pulse, provides means for avoiding that the response-pulse emitted from one substation is received by another substation so as to disturb the operation of the matrix of the latter, said response-pulse acting as an interrogating pulse.

The lengthening of the minimum time interval between two successive interrogating pulses which is required for achieving this result is relatively small and that minimum interval still remains convenient for transmitting information at the usual frequencies in the seismic field. By way of example, seismic prospecting may be carried out by using 32 geophones lined up over a distance of 10 kilometers. Each geophone is connected to a substation having a transmitter and a receiver of radio-waves. A central base station is placed on the mediatrix of the line of the substations at a distance of 5 K$m$ from the latter. The maximum time interval between two successive pulses which is available for transmitting a seismic signal at a frequency of 100, each oscillation cycle of which is represented by 3 sample values, when using a cycle of 35 interrogating pulses, is 95 microseconds.

The delay for transmission of radio-waves between the base station and the farthest substation is:

$$\frac{7.07}{300.000} \text{ second} = 23.6 \text{ microseconds}$$

With a length of the pulses of 5 microseconds, the interval of time which is available for coding purposes, including the response-time of the receiver (in most cases lower than 2 microseconds) will amount to:

$$95 - (23.6 \times 2) - 5 = 42.8 \text{ microseconds}$$

which delay is far longer than that strictly required for such coding, a time interval of 25 microseconds including 5 microseconds corresponding to the length of the response-pulse being quite satisfactory for this purpose.

The preceding computation has been made assuming that emission may start at any substation as soon as the farthest one has received the interrogating pulse. This requires in each of the other substations the use of a device retarding the striking of the encoder by the pulse issued fro mthe matrix for a duration exactly equal to the transmission delay of radio-waves over a distance corresponding to the difference between the distance of the farthest substation from the base station and the distance of the considered substation therefrom.

The retarding delay for striking the encoder is particular to each substation and must be adjusted with consideration to the location of the latter. Such an adjustment may, however, if desired, be avoided by providing in each substation for a retarding delay of the same magnitude, corresponding to the transmission delay of radio-waves over a distance corresponding to the difference between the distance of the farthest substation from the base station and the distance of the nearest substation therefrom.

In such a case, on the basis of the values hereabove mentioned by way of example, the time interval available for coding purposes, including the response-time of the receiver, will amount to:

$$95 - (23.6 \times 2) - \frac{7.07 - 5}{300.000} = 36.1 \text{ microseconds}$$

which value still exceeds the delay of 25 microseconds and is therefore sufficient.

It may be appreciated from the foregoing that the method of this invention may be carried out by using a single frequency without particular difficulties. The use of two different frequencies, one for the substations and the other for the base station, might be still of interest, however, where the oscillations to be transmitted from the instrument substantially exceed 100 c.p.s. since any limitation due to the delay for transmitting radio-waves may be thereby avoided.

In either case (use of one or two carrier frequencies) it is always possible, by means of a cycle of 35 pulses, to secure, apart from the transmission of the information emanating from 32 substations, the operation in synchronism of the matrices by allocating a pulse of the cycle for this purpose and, by means of the two remaining pulses of the cycle, to provide for remote control of all substations.

When provision is made for remote control, the latter may be carried out by the lengthening of the particular pulse used for this purpose. Thus, for example, a normal pulse having a duration of 5 microseconds may be lengthened to 10 microseconds. The 5 supplementary microseconds required in that case for such a lengthening are easily available within the interval between two successive interrogating pulses while keeping a sufficient time interval for coding purposes.

The disconnection of the receiver of the substations as soon as the substation has received the interrogating pulse may be carried out very simply by means of a one-shot multivibrator which is actuated after the delay corresponding to the time interval required for the passage of the end of a lengthened pulse (pulse for remote control) and which supplies a negative rectangular wave over the remaining period of the time interval between said interrogating pulse and the next.

However, provision is made for avoiding that said disconnection be detrimental to the receiving of the synchronizing pulse by suppressing said disconnection for a sufficient period.

Accordingly, each matrix of the substation is provided with the coincidence circuit of compartment 35 and the trailing edge of the rectangular wave supplied therefrom is applied to a one-shot multivibrator $R_f$ which in turn provides a new rectangular wave the trailing edge of which, lagging the trailing edge of the rectangular wave applied to its input by the desired time interval, actuates a second one-shot multivibrator $R_h$ (FIGURE 1) which supplies a positive rectangular wave exactly balancing the negative rectangular wave which disconnects the receiver and having a sufficient duration for giving way to the synchronization pulse.

As shown in FIGURE 12, compartments 16 and 22 of the identifier matrices of the substations are respectively connected to remote control devices T$m$ and T$v$.

The remote control device T$v$ is provided in each substation for placing the latter in a state of reduced activity, at receiving an order from the central base station, which order is received by all substations. This state of reduced activity corresponds to the maintenance in operation of the wave receivers, the identifier matrices and the synchronization device, whereas the encoder, the signal amplifier and the emitter are disconnected, which results in a corresponding reduction of the electrical energy consumption of all the substations when no signals are to be transmitted therefrom. Similarly, the remote control device T$m$, also actuated by orders from the central base station, places all the substations in condition for operation.

To these two remote controls (reduced operation control and full operation control), it may be convenient to add a third one for controlling at the central base station the correspondence between the substations and the channels as well as the proper functioning of the latter.

Accordingly, a remote control device T$k$, provided in each substation, may, for example, actuate a generator G$o$, emitting a low frequency signal which is peculiar to the considered substation and which is substituted for that of the geophone G (see FIGURE 12).

The frequencies of such particular signals emitted by substations near to each other may be different so as to make possible the identification of each interrogated substation at the control base station.

Moreover, by centering the sinusoidal wave emanating from a substation on the median axis of the corresponding channel, the influence of the transmission delay of the waves from the central base station to a substation and back is eliminated. This is of interest in the case where no provision is made for retarding devices connecting each flip-flop circuit B$k$ of the central base station to the corresponding compartment $k$ of the matrix, in view of carrying out said elimination.

The remote control of the substations requires that the pulses used for transmitting the orders from the central base station may be easily distinguished from the normal interrogating pulses. According to one particular embodiment of this invention this is achieved by lengthening the duration of those interrogating pulses which are used for remote control purposes.

Accordingly, each of the compartments of the matrix of the central base station, except the first compartment which, as already explained, is used for synchronization, is connected through a contactor C$k$, to a pulse-lengthening device A$_2$ providing a lengthened pulse to the emitter E of the central base station at each time when it is actuated by a rectangular wave issuing from one compartment of the matrix.

The pulse-lengthening device A$_2$ may consist, for instance, according to FIGURE 15, of a one-shot multivibrator. It comprises two vacuum tubes T$_9$ and T$_{10}$ connected to each other by the following manner:

The plate of T$_9$ is connected to the grid of T$_{10}$ through a resistor and the plate of T$_{10}$ to the grid of T$_9$ through a capacitor C$_9$. At rest only T$_9$ conducts. When a positive pulse of sufficient amplitude is applied to the grid of T$_{10}$, this tube becomes conducting and T$_9$ is disconnected. But, after a certain delay has elapsed, the capacitor C$_9$, which has been previously charged, is progressively discharged so that the grid potential of T$_9$ reaches again a sufficient level for providing firing of this tube, which results in a new regenerating process at the end of which the initial state is restored (T$_9$ conducting and T$_{10}$ disconnected). The duration of the corresponding cycle depends on the values of the capacitance of C$_9$ and of the other constant of the circuit.

On the cathode of tube T$_{10}$ there is obtained a positive rectangular wave, the length of which corresponds exactly to the conduction delay of the tube T$_{10}$, at each time a positive pulse is applied to the grid of said tube.

The duration of the conduction state of the tube T$_{10}$ may be adjusted at will by varying the negative polarizing potential $-V o$ applied to the grid of T$_9$.

The more negative is said polarizing voltage $-V o$, the greater is the delay of discharge of the condenser which is necessary for bringing the grid of T$_9$ to a sufficient potential for firing this tube, and, accordingly, the longer is the time of conduction of T$_{10}$.

The lengthening device A$_2$, as hereabove described, supplies a positive pulse of given length (for instance, from 2 to 5 microseconds) at each time when a pulse, issuing from the mixer M (FIGURE 9), is applied to the grid of tube T$_{10}$. However, when it is desired to lengthen the pulse, in view of remote control purposes, the positive rectangular wave issuing from that compartment of the matrix corresponding to the reference number of the pulse which has to be lengthened, is inverted so as to become negative and is thereafter applied to the grid of T$_9$.

The normal pulse issuing from the mixer M and applied to the grid of tube T$_{10}$ fires the latter which remains conducting until a sufficient discharge of the capacitor C$_9$ fires the tube T$_9$ and simultaneously disconnects the tube T$_{10}$.

Since the effect of the negative rectangular wave applied to the grid of T$_9$ is to lower the already negative polarization potential of the latter, the delay of discharge of the capacitor C$_9$ which is necessary for providing conduction through tube T$_9$ will be longer. Accordingly, the time of conduction of tube T$_{10}$ is increased and the corresponding pulse, picked up at the cathode of the latter, is correspondingly lengthened (for instance to a value in the range of 4 to 10 microseconds).

After being received at each substation (FIGURE 12), the lengthened pulses are identified by means of a pulse-length-discriminator D$i$ which may consist, for instance, of a ramp generator of the type already described providing a linearly increasing voltage during an interval of time corresponding to the length of the received pulse. Thereby, the longer is the pulse, the higher the potential difference between the terminals of the capacitor.

The two types of pulses will be easily distinguished from each other by applying said potential difference (obtained between the terminals of the capacitor) to the grid of a vacuum tube the cathode of which is so polarized that it is fired at a grid potential intermediate between that corresponding to a normal pulse and that corresponding to a lengthened pulse, the exact value of this intermediate potential within these limits being not critical.

This tube provides a pulse t$j$ at each time a lengthened pulse I$j$ is received at the substation having a reference number $k$. These pulses t$j$ are supplied to a remote control device or interrupter T$k$ (FIGURE 12) which, in turn, supplies a new pulse t$k$ only when concomitantly receiving the pulse t$j$ and a rectangular wave from the compartment $k$ of the identifier matrix, i.e., when the reference number of the lengthened pulse is one of the reference numbers ($k$) of the substation. Consequently, only the substation having a reference number $k$ is actuated by the lengthening of the pulse I$k$.

The pulse t$k$ issuing from the interrupter T$k$ is applied to a time-lag relay (so that it cannot be de-energized between two successive pulses). This relay thus remains on its "on" position and actuates the remote control device of the desired substation during the time when the contactor C$k$ at the central base station is kept on its "on" position.

The reduced-operation control and full-operation control systems, applying to all substations, are based on the same principle. The only difference consists in that the rectangular waves applied to the interrupters T$v$, T$m$ of the different substations, are provided by compartments 16, and 22 of the identifier matrices, said interrupters being therefore actuated only by pulses I$_{16}$ and I$_{22}$.

The maintenance of the contactor C$v$ or C$m$ of the central station, which actuates one of the abovementioned remote controls, on its "on" position may be avoided by providing in each substation K the relay $r_m$, of full-operation control, for instance, with an own-energizing circuit such as that shown in FIGURE 16, which maintains the relay on its "on" position as soon as it is actuated by a pulse $t_m$. This energizing circuit may be switched off by the reduced-operation controlling relay $r_v$ when the latter is energized by the corresponding lengthened pulse and vice versa.

The use of two separate pulses for carrying out respectively the reduced- and full-operations of all substations, combined with the mutual disconnection of one relay automatically produced by actuation of the other, avoids any risk of error during operation of these controls.

As shown in FIGURE 16, a lengthened pulse for full-operation control, issuing from the interrupter $Tm$, actuates a relay $r_m$ which closes the circuit $Wm\ Um$, thereby maintaining the relay $r_m$ energized. Simultaneously, the relay $r_m$, acting as a double contactor, closes the circuit $Wv\ Sm$, thereby providing at the terminal $Sm$ the current required for actuating the control device. Inversely, when the relay $r_v$ is actuated by a lengthened pulse for reduced-operation control, it closes the circuit $Wv\ Uv$ which maintains said relay $r_v$ energized and the circuit $Wm\ Sv$, thereby providing at the terminal $Sv$ the current for actuating the reduced-operation controlling device. It may be seen that actuation of the relay $r_v$ automatically results in the disconnection of the energizing circuit of relay $r_m$ and inversely the actuation of relay $r_m$ automatically switches off the energizing circuit of relay $r_v$, whereby the simultaneous actuation of the two relays is made impossible.

It must be noted that the number of emitters and receivers required for transmitting the information from a given number of instruments may be considerably reduced when all or part of the latter are located a small distance from each other.

When this is the case for all the instruments, a single substation may be used for transmitting all the information, the identifier matrix of said substation having, however, a number of channels corresponding to that of the instruments, each channel corresponding to a particular compartment of the matrix to which is connected an encoder (see FIGURE 12).

Such a simplification of the required apparatus is particularly achievable in the case of simultaneous radio-transmission of several series of information emanating from instruments of one or more flying engines or of an artificial satellite. By way of example 200 information elements emanating from each of 100 instruments might be easily transmitted, the interval between two successive interrogating pulses being limited to at most 50 microseconds which are available for coding of the information.

In such a case, and particularly when the carrier frequency used for emissions from the base station is different from that used by the substations, the transmission delay of the radio waves has no effect on the minimum interval of time required between two successive interrogating pulses, if provision is made for having the substations emitting a pulse indicating the beginning of the coding period, which replaces, at the central station, the interrogating pulse for triggering the flip-flop circuit $B_k$ used for decoding purposes.

Whereas the preceding description of this invention has been made with particular reference to its use for transmitting information and data from a plurality of instruments to a base station, other applications such as for remote control of instruments by sending orders from a base station may also be of interest.

This may be achieved by sending from the central station a pulse lagging each interrogating pulse by a time interval corresponding to the coding of an order and by providing each substation with a device for converting this time interval into an electrical value, which device may be of the type shown in FIGURE 9.

In such a case it may be also of advantage to provide for the emission by each substation of a response-signal so as to make possible the control at the base station of the carrying into effect of the order under good conditions and, in the case where execution is incomplete, to determine the extent of such incompleteness and to provide means for furthering said execution by sending complementary orders.

It will be understood that this invention is susceptible to modifications in order to adapt it to different usages and conditions and, accordingly, it is desired to comprehend such modifications within this invention as may fall within the scope of the appended claims.

What I claim is:

1. A device for the substantially simultaneous radio transmission to a central station of series of information emanating from a plurality of measuring instruments remotely located from each other and from said central station comprising means for transmitting a train of regularly spaced interrogating pulses from said central station, means for modulating the interrogating pulses with a first carrier frequency, means for coding each information value issuing from an instrument as an electric value at the same time that the corresponding interrogating pulse is received at the instrument wherein the coded information comprises time intervals between each interrogating pulse and a corresponding response-pulse, means for transmitting from a substation associated to said instrument, after modulation with a second carrier frequency, the sequentially produced response pulses so that a cycle of response pulses comprises a plurality of information values which is equal to the number of instruments, the entire series of information being transmitted by a plurality of successive cycles, means for receiving the second frequency at the central station, means for decoding at the central station the information received at said second frequency, said first and second carrier frequencies being equal, means at each substation for delaying the emission of any response-pulses until the corresponding interrogating pulse has arrived at all of the substations, means for interrupting the receiving of pulses at said substations after the passage of an interrogating pulse for a sufficient time interval for avoiding the receiving at any substation of a response pulse emanating from another substation, and means for interrupting the receiving of pulses at the central station when sufficient time has elapsed for the transmission of radio-waves from the farthest substation to the central station after the end of the maximum available coding interval.

2. A device for the substantially simultaneous transmission of series of electrical values between a central station and a plurality of sub-stations remotely located from each other and from said central station, and connected each to at least one instrument, comprising; means at the central station for emitting therefrom a continuous series of pulses spaced at regular time intervals, means for distributing said pulses over successive cycles of $n$ pulses each, $n$ being an integer at least equal to the total number of instruments by allocating a reference numeral to each pulse in the cycle, said means consisting of an identifier-matrix comprising $n$ compartments, means for interrelating electrical values and time intervals between successive pulses, said means consisting of $n$ units each of which is associated to a separate compartment of the identifier matrix, means at each sub-station for receiving the pulses emanating from the central station, means for distributing said pulses over successive cycles of $n$ pulses each by allocating a reference numeral to each pulse in the cycle, said means consisting of an identifier-matrix comprising $n$ compartments, means for interrelating electrical values and time intervals between successive pulses, said means being actuated by the compartments of the identifier-matrix having the reference numerals of the instruments connected to the station, and a system for synchronizing said pulse distributing means of the substations with that of the central station to thereby provide for the allocation to any pulse of the same reference numeral in the cycle by the identifier-matrices of the sub-station and of the central station, comprising in combination means for producing at the central station a supplementary pulse per cycle, introduced thereinto between the normal interval between a pulse of a given reference numeral and the following pulse of the cycle, said means being controlled exclusively by the arrival of the pulse of said reference numeral at the compartment of the identifier-matrix having the same reference numeral and means in each sub-station for blocking the receival of the pulses, said means being controlled exclusively by any pulse received at the sub-station identifier-matrix compartment having said reference numeral, whereby said blocking is achieved over a time interval at least equal to the interval between said supplementary pulse and the preceding one and smaller than the normal time interval between the successive pulses of the cycle.

3. A device for the substantially simultaneous transmission of series of electrical values between a central station and a plurality of sub-stations remotely located from each other and from said central station, and connected each to at least one instrument, comprising; means at the central station for emitting a continuous series of interrogating pulses spaced at regular time intervals, means for distributing said pulses over successive cycles of $n$ pulses each, $n$ being an integer at least equal to the total number of instruments by allocating a reference numeral to each pulse in the cycle, said means consisting of an identifier-matrix comprising $n$ compartments, means for receiving response pulses emanating from the sub-stations, means for decoding electrical values coded in the form of time intervals between successive pulses, said means consisting of $n$ decoding units, each of which is associated to a corresponding compartment of the identifier-matrix, means at each sub-station for receiving the interrogating pulses emanating from the central station, means for distributing said pulses over successive cycles of $n$ pulses each by allocating a reference numeral to each pulse in the cycle, said means consisting of an identifier-matrix comprising $n$ compartments, means for encoding electrical values, supplied by the instruments, in the form of time intervals between successive pulses, said means being actuated by the compartments of the identifier-matrix having the reference numerals of the instruments connected to the station, and a system for synchronizing said pulse distributing means of the sub-stations with that of the central station, to thereby provide for the allocation to any pulse of the same reference numeral in the cycle by the identifier-matrices of the sub-station and of the central station, comprising in combination means for producing at the central station a supplementary pulse per cycle, introduced thereinto between the normal interval between a pulse of a given reference numeral and the following pulse of the cycle, said means being controlled exclusively by the arrival of the pulse of said reference numeral at the compartment of the identifier-matrix having the same reference numeral and means at each sub-station for blocking the receival of the pulses, said means being controlled exclusively by any pulse received at the sub-station identifier-matrix compartment having said reference numeral, whereby said blocking is achieved over a time interval at least equal to the interval between said supplementary pulse and the preceding one and smaller than the normal time interval between the successive pulses of the cycle.

4. A device for the substantially simultaneous radio transmission between a central station and a plurality of sub-stations remotely located from each other and from said central station, each of which is associated to at least one measuring instrument, comprising means at the central station for emitting therefrom a continuous series of interrogating pulses spaced at regular time intervals, means for distributing said pulses over successive cycles of $n$ pulses each, $n$ being an integer at least equal to the total number of instruments by allocating a reference numeral to each pulse in the cycle, said means consisting of an identifier-matrix comprising $n$ compartments, means for receiving radio-waves at a first pulse-modulated carrier frequency emitted from the sub-station, means for demodulating the same, thus restoring response pulses emanating therefrom, means for decoding information values coded in the form of a time interval between two successive pulses into electric values, said means consisting of $n$ decoding units each of which is associated to a corresponding compartment of the identifier matrix, means for modulating a second carrier frequency by said series of interrogating pulses and means for radio transmitting said modulated carrier frequency, a radio-receiver at each sub-station comprising demodulating means restoring the series of transmitted pulses, means for distributing said pulses over successive cycles of $n$ pulses each, by allocating a reference numeral to each pulse in the cycle, said means consisting of an identifier-matrix comprising $n$ compartments, means for coding each electric measuring value provided by an instrument in the form of a time interval between the receival of the interrogating pulse having the same reference numeral as said instrument and the emission of a response pulse by said coding means, said coding means comprising $n$ coding units actuated by the compartments of the identifier-matrix having the respective reference numerals of the instruments associated to the sub-station at the time when said compartments receive the interrogating pulses having said respective reference numerals, means for modulating said first carrier frequency by said response pulse and means for radio transmitting said modulated carrier frequency, and a system for synchronizing said pulse distributing means of the sub-stations with that of the central station providing for the allocation to any pulse of the same reference numeral in the cycle, by the identifier matrices of the sub-station and of the central station, comprising in combination means for producing at the central station a supplementary pulse per cycle, introduced thereinto within the normal interval between a pulse of a given reference numeral and the following pulse of the cycle, said means being controlled exclusively by the arrival of the pulse of said reference numeral at the compartment of the identifier matrix having the same reference numeral, and, in each sub-station, means for blocking the receival of the pulses, said means being controlled exclusively by any pulse received at the sub-station identifier matrix compartment having said reference numeral, whereby said blocking is achieved over a time interval at least equal to the interval between said supplementary pulse and the preceding one and smaller than the normal time interval between the successive pulses of the cycle.

5. A device according to claim 2 wherein the number of compartments of the identifier matrices of the central station and the sub-stations in excess of the number of instruments are destined to receive corresponding pulses of the cycle which are produced at the central station and control the sub-stations.

6. A device according to claim 2 further comprising means for controlling the sub-stations by means of the interrogating pulses comprising means at the central station for lengthening the interrogating pulse corresponding in the cycle to the sub-station which is to be controlled, and means at each sub-station for identifying the lengthened pulse, in association with means for operating the control of said sub-station.

7. A device for the substantially simultaneous radio-transmission to a base station of series of information emanating from a plurality of remote measuring instruments comprising at said base station a pulse-generator providing two identical series of cycles of $n$ pulses regularly spaced from one another, a first of said series being shifted with respect to the second by a time interval equal to one half of the time interval between two successive pulses of a series, a pulse identifier matrix allocating a reference numeral in the cycle to each pulse, comprising a first chain of flip-flop circuits connected to a divider by $m$ and a second chain of flip-flop circuits connected to a divider by $p$, the product $mp$ being equal to $n$, $m$, and $p$ being integers incommensurate to each other, $n$ coincidence circuits each of which is connected to both one flip-flop circuit of the first chain and one flip-flop circuit of the second chain, said coincidence circuit having a reference numeral corresponding to those of the pulses in the cycle, each of such coincidence circuits producing a rectangular wave only when actuated by the simultaneous receiving of two rectangular waves produced by the two flip-flop circuits connected thereto, a mixer receiving said first series of pulse cycles and one supplementary pulse from each cycle of the second series through an interrupting device initiated by the rectangular wave produced by the first of the $n$ coincidence circuits of the matrix, a modulator, a radio transmitter radiating the train of pulses obtained at said mixer after modulation of the same with a first carrier frequency, a radio receiver tuned to a second carrier frequency, a demodulator and a series of decoding flip-flop circuits, each associated to one of the coincidence circuits of said matrix and triggered by the front of the rectangular wave produced by said coincidence circuit, said flip-flop circuit being connected to the output of said demodulator and triggered back to its initial state by the pulse I'k received at said receiver within the time interval of said last-mentioned rectangular wave, and at each of a plurality of sub-stations, being associated to at least one measuring instrument, a radio receiver tuned to said first carrier frequency, a demodulator, a pulse identifier matrix identical to that of the base station, an interrupting device initiated by a negative rectangular wave derived from that rectangular wave produced by the first coincidence circuit of said last mentioned matrix, said negative rectangular wave suppressing each supplementary pulse received within the interval between the first and the second pulse of said first series, at least one encoding device associated to a coincidence circuit responsive to the pulse having the reference numeral of one instrument of said sub-station, said encoding device comprising a ramp generator initiated by the front of the rectangular wave produced by said coincidence circuit and a voltage comparator comparing at each instant the voltage of the ramp to that representing an information value which has to be transmitted to the base station and which is produced by said instrument, a pulse generator initiated by said comparator when the voltage of said ramp becomes equal to that of said information value, and a modulator of said pulse with said second carrier frequency associated to a radio transmitter.

8. A device for the substantially simultaneous radio transmission to a base station of series of information emanating from a plurality of remote measuring instruments as described in claim 7, further comprising at said base station a pulse-lengtheninng device actuated by a rectangular wave derived from that produced by any one of the coincidence circuits of the identifier matrix, $n$ contactors, each connected to the output of a separate coincidence circuit and transmitting the rectangular wave produced by the latter, when operated, to said pulse-lengtheninng device receiving the series of pulses from said mixer and providing the radio emitter of said base station with a series of pulses comprising lengthened pulses having in the cycle the reference numerals of those coincidence circuits connected to the operated contactors and, at each of said sub-stations a pulse-length-discriminator providing a voltage the magnitude of which depends on the length of the pulses applied thereto and a series of controlling coincidence circuits each connected to the output of a separate coincidence circuit of the identifier matrix of said sub-station as well as to said pulse-length-discriminator, each controlling coincidence circuit producing a controlling pulse at each time when the higher voltage produced by the pulse-length-discriminator at the receiving of a lengthened pulse is concomitant to the rectangular wave produced by the coincidence circuit of the matrix associated to said controlling coincidence circut, said controlling pulse being used for initiating a telecontrol system.

9. A device for the substantially simultaneous radio transmission to a base station of series of information emanating from a plurality of remote instruments as described in claim 7 wherein said first and second frequencies are equal, further comprising a separate one-shot multivibrator connected to each coincidence circuit which is associated to an instrument, said multivibrator retarding the initiation of the encoding device by a suitable delay after the front of a rectangular wave produced by the corresponding coincidence circuit of the identifier matrix, another one-shot multivibrator connected at the output of the demodulator and providing a negative rectangular wave of the desired length after receiving each interrogating pulse.

10. A device for the substantially simultaneous transmission of series of electrical values between a central station and a plurality of sub-stations remotely located from each other and from said central station, and connected each to at least one instrument, comprising means at the central station for emitting a continuous series of interrogating pulses spaced at regular time intervals, means for distributing said pulses over successive cycles of $n$ pulses each, $n$ being an integer at least equal to the total number of instruments by allocating a reference numeral to each pulse in the cycle, said means consisting of an identifier-matrix comprising $n$ compartments, means for receiving response pulses emanating from the sub-stations, means for decoding electrical values each in the form of a time interval between an interrogating pulse produced at said central station and the next response pulse received from a sub-station at said central station, said means consisting of $n$ decoding units ($B_k$, $B_k+1$, . . .) each of which is associated to a corresponding compartment of the identifier matrix, including means for retarding the initiation of the decoding period by twice the transmission delay between the central station and said sub-station, means at each sub-station for receiving the interrogating pulses emanating from the central station, means for distributing said pulses over successive cycles of $n$ pulses each by allocating a reference numeral to each pulse in the cycle, said means consisting of an identifier-matrix comprising $n$ compartments, means for encoding each of the electrical values supplied by the instruments by production of a response-pulse distant from the instant of arrival at said sub-station of the interrogating pulse having the same reference numeral by a time interval representing the coded form of said electrical value, said means being actuated by the compartments of the identifier-matrix having the reference numerals of the instruments connected to the station, and a system for synchronizing said pulse distributing means of the sub-stations with that of the central station, providing for the allocation to any pulse of the same reference numeral in the cycle by the identifier-matrices of the sub-station and of the central station, comprising in combination means for producing at the central station a supplementary pulse per cycle, introduced thereinto between the normal interval between a pulse of a given reference numeral and the following pulse of the cycle, said means being controlled exclusively by the arrival of the pulse of said reference numeral at the compartment of the identifier-matrix having the same reference numeral and, in each sub-station, means for blocking the receival of the pulses, said means being controlled exclusively by any pulse received at the sub-station identifier-matrix compartment having said reference numeral, whereby said blocking is achieved over a time interval at least equal to the interval between said supplementary pulse and the preceding one and smaller than the normal time interval between the successive pulses of the cycle.

References Cited by the Examiner

UNITED STATES PATENTS

| | | | |
|---|---|---|---|
| 2,524,832 | 10/1950 | Poylo | 340—183 |
| 2,537,056 | 1/1951 | Hoeppner | 340—183 |
| 2,689,949 | 9/1954 | Kalbach | 340—183 |
| 2,717,370 | 9/1955 | Piper | 340—151 |
| 2,796,602 | 6/1957 | Hess | 179—15 |
| 2,857,526 | 10/1958 | Galton | 340—183 |
| 2,917,728 | 12/1959 | Grossman | 340—183 |
| 2,928,900 | 3/1960 | Pawley | 340—183 |
| 2,942,244 | 6/1960 | Larson | 340—182 |
| 2,955,278 | 10/1960 | Sibley | 340—163 |
| 2,964,708 | 12/1960 | Steele | 340—183 |
| 3,018,449 | 1/1962 | Farrelly | 340—147 |
| 3,021,508 | 2/1962 | White | 340—147 |
| 3,093,795 | 6/1963 | Jones | 340—163 |

FOREIGN PATENTS 1,001,324   1/1957   Germany.

NEIL C. READ, *Primary Examiner.*

L. MILLER ANDRUS, *Examiner.*

T. B. HABECKER, P. XIARHOS, *Assistant Examiners.*